US007259805B2

(12) United States Patent
Song et al.

(10) Patent No.: US 7,259,805 B2
(45) Date of Patent: Aug. 21, 2007

(54) ARRAY SUBSTRATE OF LIQUID CRYSTAL DISPLAY DEVICE AND MANUFACTURING METHOD THEREOF

(75) Inventors: In Duk Song, Gumi-si (KR); Gyo Won Chin, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 97 days.

(21) Appl. No.: 10/702,615

(22) Filed: Nov. 7, 2003

(65) Prior Publication Data

US 2004/0090562 A1 May 13, 2004

(30) Foreign Application Priority Data

Nov. 7, 2002 (KR) ...................... 10-2002-0068877

(51) Int. Cl.
*G02F 1/1343* (2006.01)
(52) U.S. Cl. ....................................................... 349/38
(58) Field of Classification Search .................... 349/38
See application file for complete search history.

(56) References Cited

U.S. PATENT DOCUMENTS 6,392,623 B1    5/2002    Shimada 6,762,802 B2 *  7/2004    Ono et al. ..................... 349/38
2001/0041394 A1 11/2001   Park et al.
2002/0015918 A1  2/2002   Bae

FOREIGN PATENT DOCUMENTS

DE      198 11 624 A1    3/1998
FR      2 734 082       11/2001

* cited by examiner

*Primary Examiner*—David Nelms
*Assistant Examiner*—Richard H Kim
(74) *Attorney, Agent, or Firm*—McKenna Long & Aldridge LLP

(57) ABSTRACT

There is provided an array substrate of an LCD device including a plurality of gate lines aligned on the substrate, a plurality of data lines crossing the gate lines to form a plurality of pixel regions, a thin film transistor located at the intersection of the gate lines and the data lines, and a pixel electrode located in each pixel region, wherein the array substrate further includes a storage capacitor including a lower storage electrode being across the data line and being in parallel with the gate line on the same layer as the gate line, and a semiconductor layer, being formed by a diffraction pattern, interposed between the lower storage electrode and the pixel electrode.

6 Claims, 8 Drawing Sheets

ARRAY SUBSTRATE OF LIQUID CRYSTAL DISPLAY DEVICE AND MANUFACTURING METHOD THEREOF

This application claims the benefit of the Korean Application No. 10-2002-68877, filed on Nov. 7, 2002, the entirety of which is hereby incorporated by reference for all purposes as if fully set forth herein.

BACKGROUND OF THE INVENTION

1. Field of the Invention

The present invention relates to a liquid crystal display device, and more particularly, to an array substrate of a liquid crystal display device for providing an on-common type storage capacitor by 4-mask processes, and a manufacturing method thereof.

2. Discussion of the Related Art

Generally, a liquid crystal display (LCD) device includes two transparent substrates, with a gap between them, a liquid crystal material, being optically anisotropic and injected between the two transparent substrates, and a driving element for applying voltages to the liquid crystal material.

Nowadays, such LCD devices are used for the display means of computers or the like, and their display areas have been growing. The driving of a large LCD device is achieved by employing an active matrix-type array structure having several tens of thousands of pixels with data lines and gate lines passing the periphery of each of the pixels, and a thin film transistor as the driving element placed at each point where the data line and the gate line cross.

In such an active matrix-typed LCD device, it is necessary to maintain the signal voltage input through the data line for a period of time until the input of the next signal voltage is provided to the data line so as to ensure the uniformity of the image. To achieve this, a storage capacitor is formed in parallel with a liquid crystal cell.

The storage capacitor formed in the LCD device is classified into either an on-common type or an on-gate type according to how the electrode is used for charging.

The on-gate type storage capacitor uses a part of an (n−1)th gate line as a storage electrode of an nth pixel. It has advantages of a low decrease of aperture ratio, low incidence of point defects occurring in the normally white mode (NW mode), and a good production yield, but it has a disadvantage of long scanning signal time.

The on-common type storage capacitor employs an additional separate charge electrode. It has advantages such as short scanning signal time, but it has disadvantages of high decrease of the aperture ratio, a significant rate of point defects occurring in the normally white mode (NW mode), and a low production yield.

Now, referring to FIG. 1, a simple description of the on-common type storage capacitor will be described.

FIG. 1 is a schematic representation of the related art array substrate of an LCD device having the on-common type storage capacitor formed thereon.

In reference to FIG. 1, the array substrate of the LCD device having the on-common type storage capacitor formed thereon is configured to include a plurality of gate lines 109, 119 intersecting a plurality of data lines 110, 120 on an insulating substrate as a lower substrate. At the intersection of a data line (for example, 110) and a gate line (for example, 119), there is formed a thin film transistor (TFT) which is composed of a source electrode 111 and a drain electrode 112 in the same circuit layer as the data line 110, a gate electrode 114 in the same circuit layer as the gate line 119, and a semiconductor layer 113.

Further, a pixel electrode 115 is formed to be connected to the drain electrode 112 and spaced from the gate line 119 and the data line 110, and a lower storage electrode 116 is located in parallel with the gate line 119, stretching across the pixel electrode 115.

The on-common type storage capacitor structured as above stores electric charges between the pixel electrode 115 acting as the upper storage electrode, and the lower storage electrode 116 formed of the same material as the gate electrode 114. The capacitance of the storage capacitor structured as above is determined by the formula:

$$C = \varepsilon \frac{A}{d},$$

where C is capacitance, ∈ is dielectric constant, A is the area of the electrode, and d is the separation between the electrodes.

The capacitance of the storage capacitor is required to be large enough to ensure the uniformity of the image displayed on the LCD device.

Another method of accomplishing this function is a capacitor with a separate upper storage electrode formed under the pixel electrode, and a reduced separation distance d between the electrodes is so as to increase the capacitance as shown in FIGS. 2 and 3.

FIG. 2 is a schematic representation of a related art improved array substrate of an LCD device having an on-common type storage capacitor formed thereon, and FIG. 3 is a detailed sectional view of the I portion of FIG. 2.

In reference to FIGS. 2 and 3, the basic structure of the array substrate having the improved on-common type storage capacitor formed thereon is similar to the structure of the related art array substrate of FIG. 1, but with the difference of the changed structure of upper storage electrode 217.

Accordingly, the like elements in the FIG. 1 will be referred to as like numerals, and the different elements from those of FIG. 1 will be described herein after.

As shown in FIGS. 2 and 3, the improved on-common type array substrate includes the upper storage electrode 217 having a predetermined area formed on the same layer as a data line 110 and under a pixel electrode 115 using the same material as the data line 110.

A through hole region 305 having through holes exists in a part of a protecting layer 303 covering the upper storage electrode 217, and the pixel electrode 115 and the upper storage electrode 217 are electrically connected through the through hole region 305.

The on-common type storage capacitor structured as above, stores electric charges between the upper storage electrode 217 formed as the same material as the data line 110, and a lower storage electrode 116 formed as the same material as a gate electrode 114.

In comparison to the on-common type storage capacitor in FIG. 1, because the separation of the two electrodes of the storage capacitor is reduced, a greater capacitance can be achieved.

Such on-common type storage capacitors, thin film transistors, pixel electrodes, and the like are formed through five photo processes. That is, the manufacturing process uses five masks.

However, each photo process involves complicated processing steps, and each additional process step results in an increase in process failures. Therefore, increasing the number of photo processes involved increases the occurrence of failures, thereby deteriorating the production yield of substrates.

SUMMARY OF THE INVENTION

Accordingly, the present invention is directed to an LCD device and a manufacturing method thereof that substantially obviates one or more problems due to limitations and disadvantages of the related art.

An advantage of the present invention is to provide an LCD device and a manufacturing method thereof applying a diffraction pattern used in the channel portion of a thin film transistor to a storage portion of an on-common type capacitor in the LCD device manufactured by 4-masks processes, thereby simplifies the complicated pattern of the storage portion and reducing the number of masks used.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, there is provided an array substrate of an LCD device including a plurality of gate lines aligned on the substrate, a plurality of data lines being across the gate lines to form a plurality of pixel regions, a thin film transistor located in a crossing portion of the gate line and the data line, and a pixel electrode located in each pixel region, wherein the array substrate may further include a storage capacitor including a lower storage electrode being across the data line and being in parallel with the gate line on the same layer as the gate line, and a semiconductor layer, being formed by a diffraction pattern, interposed between the lower storage electrode and the pixel electrode.

In another aspect of the present invention, there is provided a method of manufacturing an array substrate of an LCD device including the steps of forming a gate line, a gate electrode, and a lower storage electrode on the substrate by a first mask; forming an insulating layer, a semiconductor layer, an impurity semiconductor layer, and a metal layer sequentially on the gate line, the gate electrode, and the lower storage electrode; etching the metal layer and the impurity semiconductor layer by a second mask to form a data line and a source/drain electrode, and exposing the semiconductor layer on the lower storage electrode; forming a protection layer on the data line, the source/drain electrode, and the exposed semiconductor layer; etching the protection layer by a third mask to form a contact hole and a through hole above a part of the drain electrode and the exposed semiconductor layer, and depositing a transparent electrode thereon; and patterning the transparent electrode by a fourth mask so as to be electrically connected to the drain electrode through the contact hole, and forming the pixel electrode to form a upper storage electrode corresponding to the lower storage electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Figure 1:
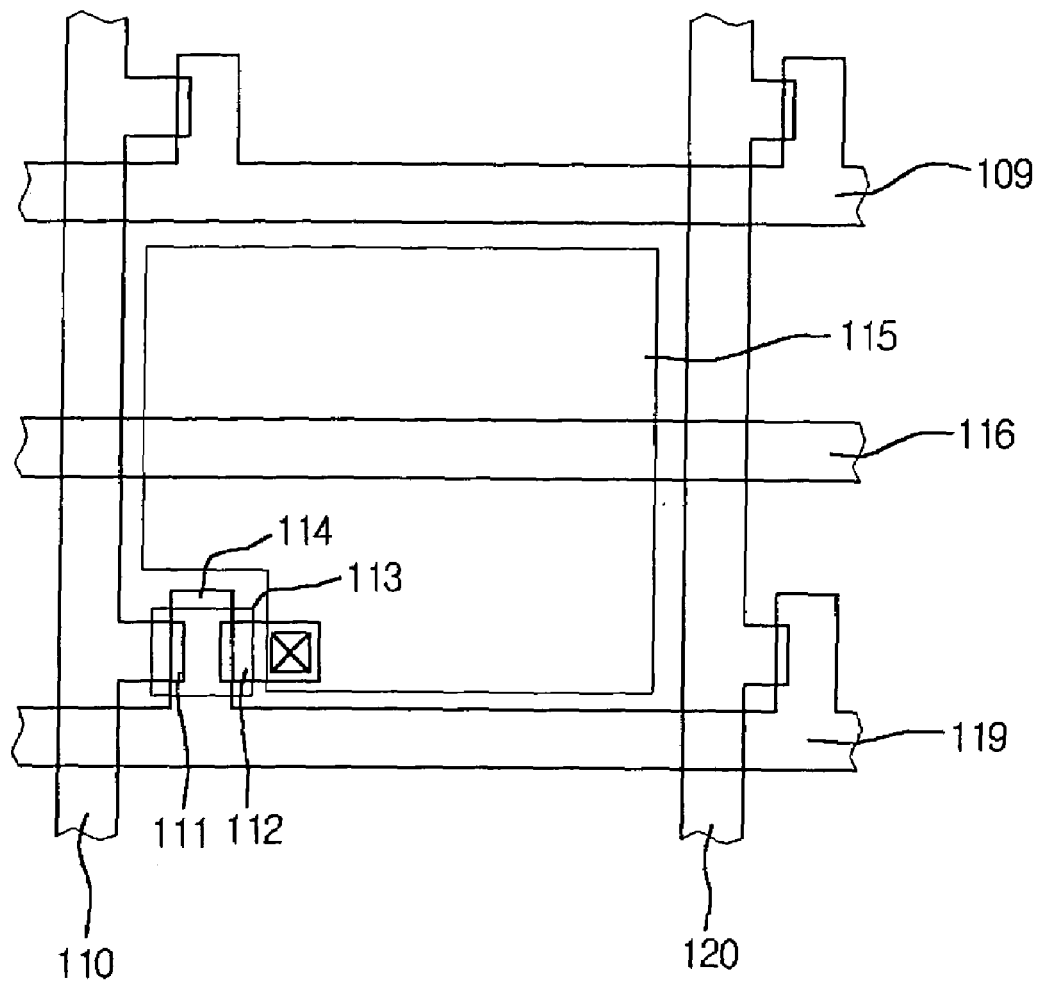
FIG. 1 is a schematic representation of a related art array substrate of an LCD device having an on-common type storage capacitor formed thereon.
Figure 2:
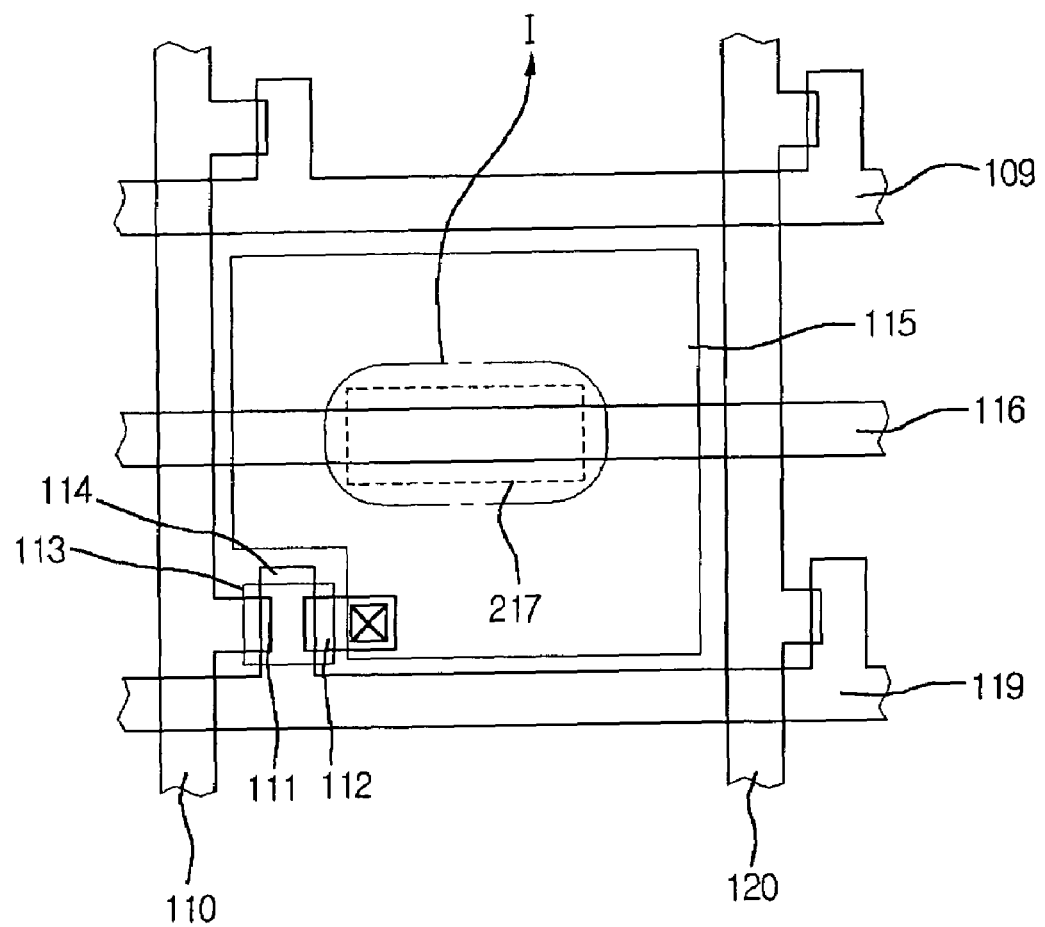
FIG. 2 is a schematic representation of a related art improved array substrate of an LCD device having an on-common type storage capacitor formed thereon.
Figure 3:
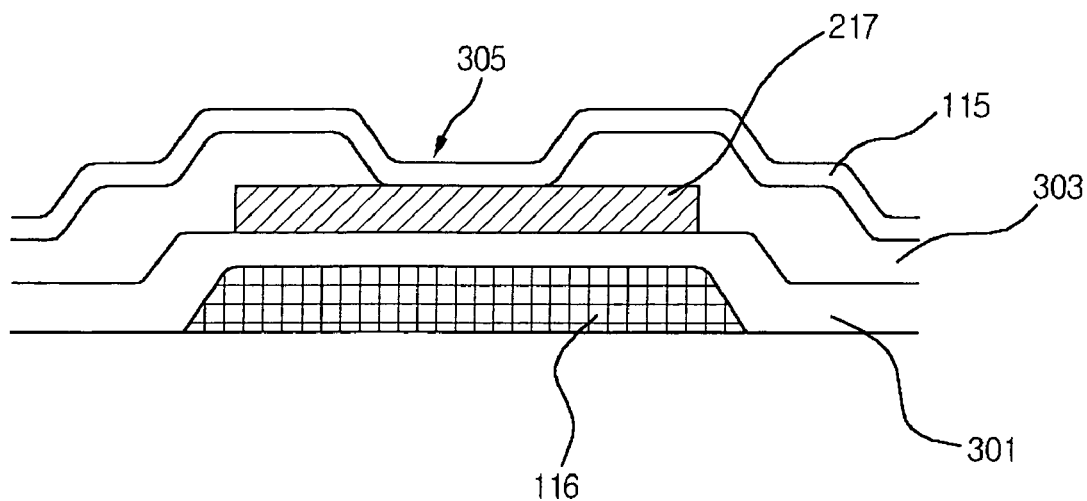
FIG. 3 is a detailed sectional view of the I portion of FIG. 2.
Figure 4:
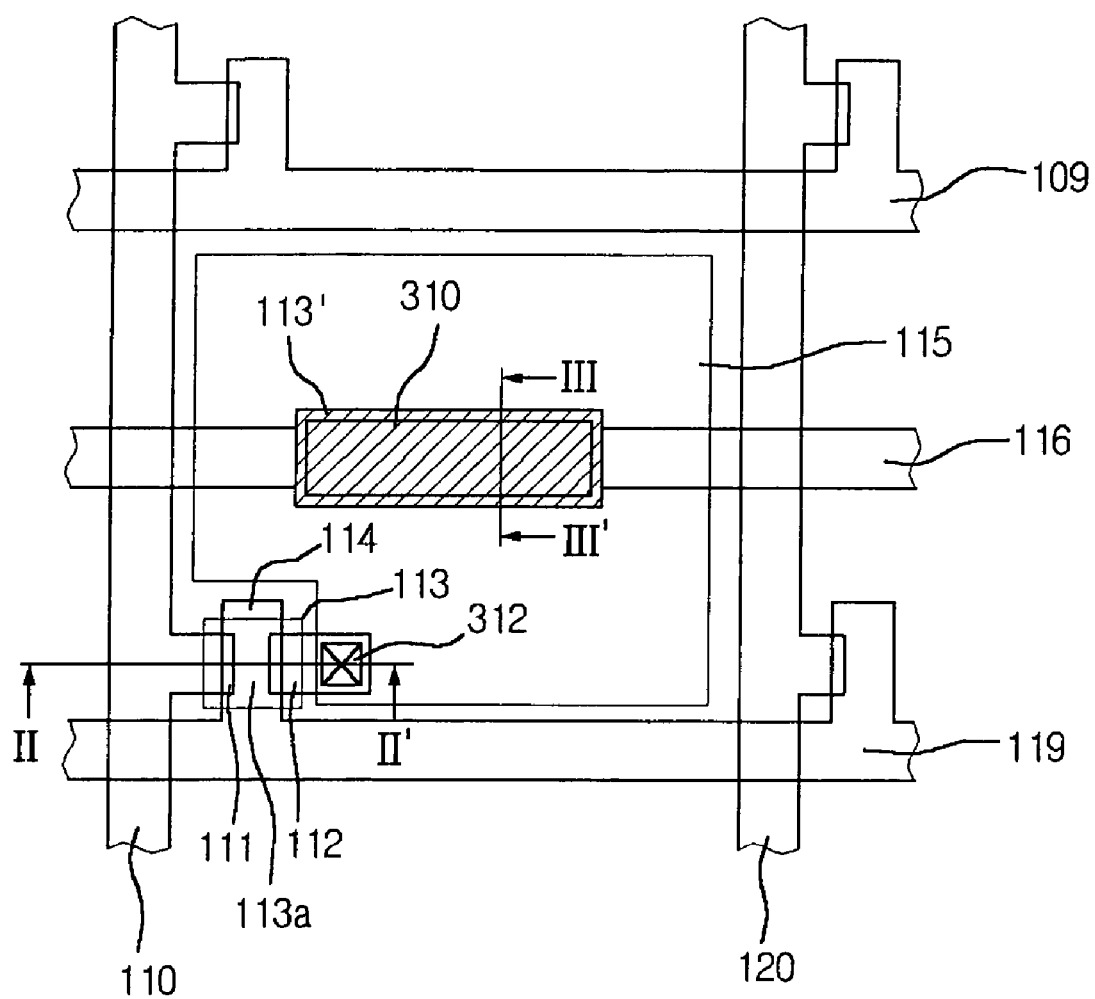
FIG. 4 is a schematic illustration of an array substrate of an LCD device having an on-common type storage capacitor formed thereon according to the present invention.

FIG. 4 is a schematic representation of an array substrate of an LCD device having an on-common type storage capacitor formed thereon according to the present invention.

Referring to FIG. 4, a pixel electrode 115 is directly used as an upper electrode of the storage capacitor instead of using data metal as the upper electrode, and a through hole 310 is formed on a semiconductor layer 113' to reduce the interval between the upper electrode and a lower storage electrode 116 so that the pixel electrode 115 is connected to the semiconductor layer 113'.

Each pixel region of the array substrate of the LCD device of the present invention roughly includes a gate line, a data line, a thin film transistor, a storage capacitor, and a pixel electrode as described above.

The thin film transistor is a switching element applying an electric field to the pixel electrode 115 of the pixel region. The gate electrode 114 of the thin film transistor is extended from the gate line 119, and the source electrode 111 is extended from the data line 110.

Further, the drain electrode 112 is connected to the pixel electrode 115 of the pixel region through a contact hole 312, and a part of the semiconductor layer 113 is exposed between the source electrode 111 and the drain electrode 112 to form a channel 113a.

That is, the array substrate of an LCD device of the present invention includes a plurality of gate lines 109, 119 aligned on the substrate, a plurality of data lines 110, 120 across and substantially perpendicular to the gate lines 109, 119, which define a plurality of pixel regions, a thin film transistor located on the crossing portion of the gate line and the data line as a switching element, and a pixel electrode 115 located on each pixel region. Further, the array substrate of an LCD device includes a storage capacitor having a lower storage electrode 116 across the data line and in parallel with the gate line on the same layer where the gate line is formed, and a semiconductor layer 113' being formed by the use of a diffraction pattern and interposed between the lower storage electrode 116 and the pixel electrode 115. Further, since the array substrate of an LCD device of the present invention is formed by a 4-mask process, a source electrode 111 and a drain electrode 112 of the thin film transistor, and a channel 113*a* between the source electrode 111 and the drain electrode 112 are formed by the same mask process.

Further, the semiconductor layer 113' between the lower storage electrode 116 and the pixel electrode 115 is formed by the above mask process, and the mask process uses a mask having a diffraction pattern formed thereon.

The semiconductor layer 113' is formed inside the pixel region at least as wide as the lower storage electrode 116.

Therefore, according to the present invention, in the case of forming the array substrate by the 4-mask process, the capacitance of the storage capacitor can be increased by reducing the separation d between two electrodes of the storage capacitor.

FIGS. 5A to 5F are sectional views of the array substrate of the LCD device taken along the lines of II-II' and III-III' of FIG. 4, respectively, in order to show the manufacturing process of the array substrate of the LCD device according to the present invention.

The II-II' is a thin film transistor region, and the III-III' is a storage capacitor region.

Referring to FIG. 4, the manufacturing process of the present invention according to FIGS. 5A to 5F will be explained.

First, metal such as aluminum or aluminum alloy, having low resistance is deposited on a transparent substrate to form a first metal layer.

The first metal layer is used to form a gate line, etc. The reason for using a metal such as aluminum that has a low resistance as a gate line is that the time constant of the gate line is increased when the gate line is used as the electrode of the storage capacitor. Therefore, the use of aluminum for the gate line helps to decrease the time constant because aluminum has low resistance while other materials such as tantalum (Ta) or chrome (Cr) have high resistance.

Then, by performing the etching using the first metal layer as a first mask, a gate pad (not shown), gate lines 109, 119 (FIG. 4), a gate electrode 114, and a lower storage electrode 116 are formed.

Figure 5A:
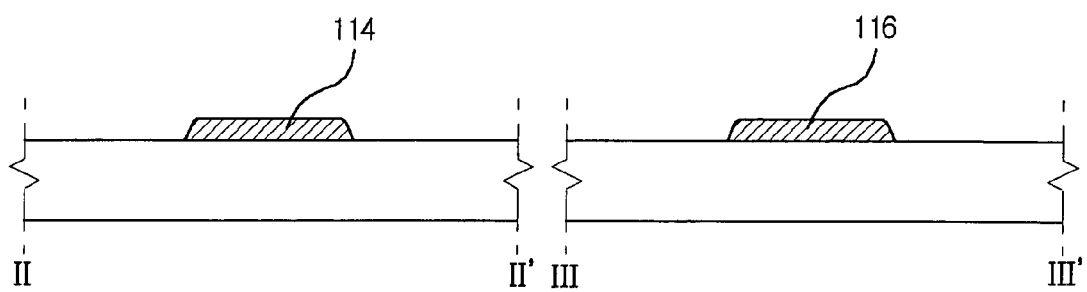
FIGS. 5A to 5F are sectional views illustrating the array substrate of the LCD device taken along the lines of II-II' and III-III' of FIG. 4 respectively in order to show the manufacturing process of the array substrate of the LCD device according to the present invention.

The gate electrode 114 extends from the gate line and is formed on the corner of the pixel region. The lower storage electrode 116 is formed inside the pixel region between the gate lines, which is depicted in FIG. 5A.

Figure 5B:
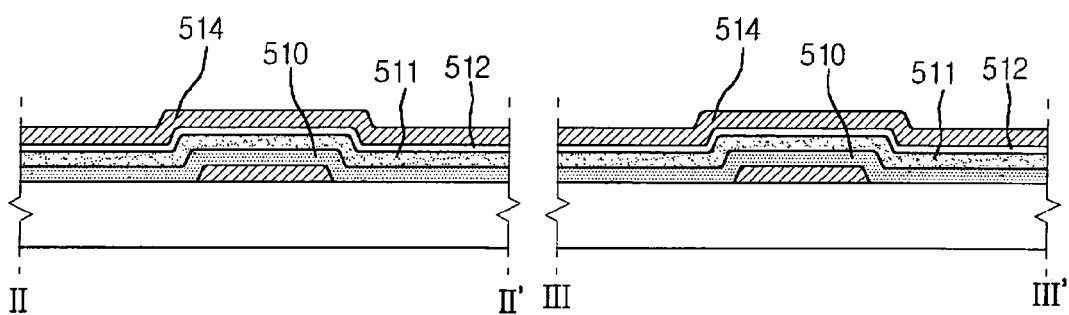

Then, as shown in FIG. 5B, on the substrate having the gate line, etc. are sequentially formed an insulating layer 510, a semiconductor layer 511 an impurity semiconductor layer 512 and a second metal layer 514. The insulating layer 510 is formed with inorganic insulating material such as silicon nitride ($SiN_x$) or silicon dioxide ($SiO_2$), or organic insulating material such as benzocyclobutene (BCB) or acryl group resin. The semiconductor layer 511 is formed with intrinsic semiconductor material such as purely amorphous silicon. The impurity semiconductor layer 512 is formed with semiconductor material having $N^+$ or $P^+$ impurities. The second metal layer 514 is formed with the metal having high melting point such as molebdynum (Mo), tantalum (Ta), tungsten (Wo), or antimony (Sb).

Figure 5C:
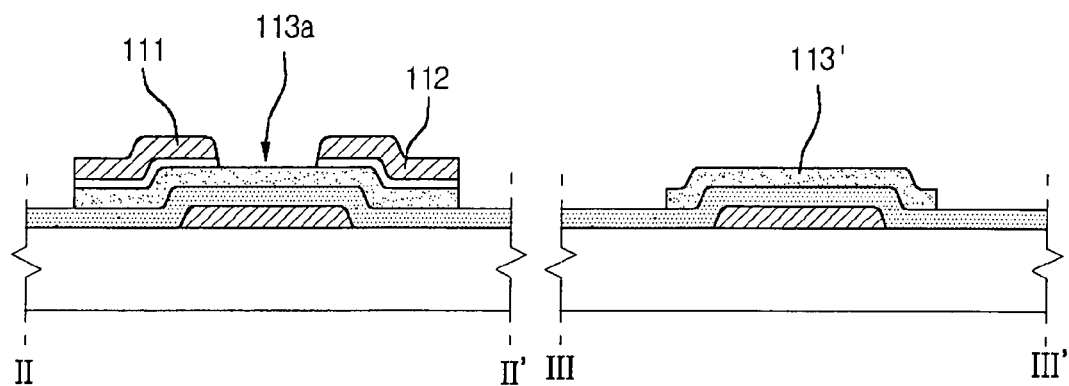

Then, as shown in FIG. 5C, the second metal layer 514 and the impurity semiconductor layer 512 are patterned in the thin film transistor region, that is, the area indicated by II-II' in FIG. 5C by using a second mask so as to form data lines 110, 120 (FIG. 4) and the source/drain electrode 111, 112, and in the storage capacitor region, that is, the area indicated by III-III' in FIG. 5C, the semiconductor layer 113' is exposed above the lower storage electrode 116.

The source electrode 111 and the drain electrode 112 are formed apart from each other thereby forming a channel 113*a*, and the impurity semiconductor material of the channel 113*a* is removed by using the source electrode 111 and the drain electrode 112 as a mask. Thus, the impurity semiconductor layer 512 remaining on the lower side of the source electrode 111 and the drain electrode 112 becomes an ohmic contact layer.

As such, the second mask has a diffraction pattern in a specific region, and since the light passing through the diffraction pattern region is weak in its intensity, the thickness of the photoresist deposited on the substrate to form the pattern of the source/drain electrode on the substrate is different in the all regions.

Figure 6A:
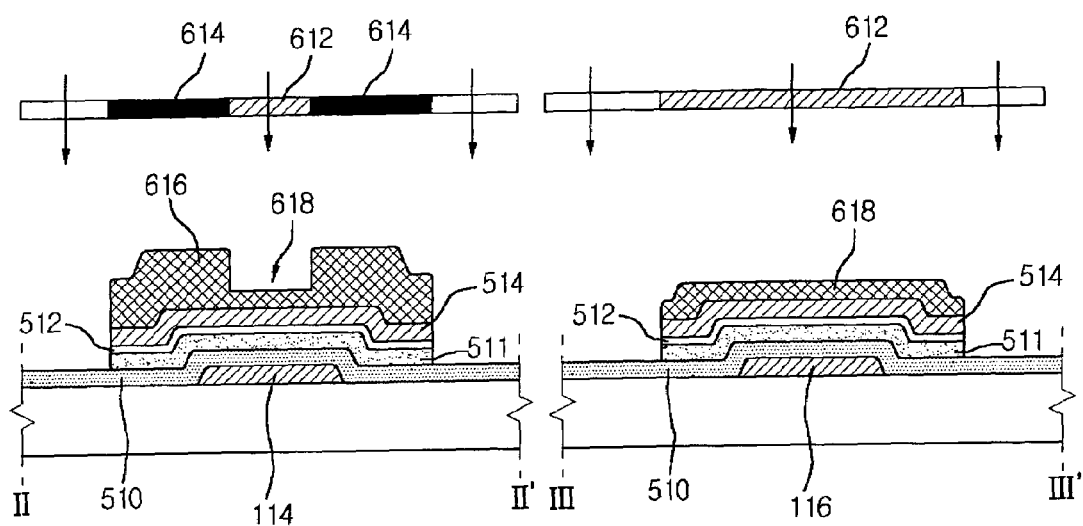
FIGS. 6A and 6B are detailed illustrations of the manufacturing process of FIG. 5C.
Figure 6B:
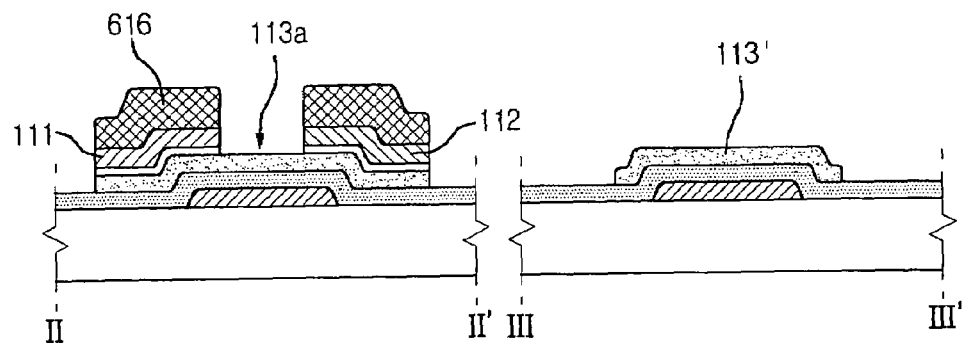

FIGS. 6A and 6B are detailed illustrations of the manufacturing process of FIG. 5C.

FIG. 6A is a representation showing that a mask having a diffraction pattern is formed in the channel region and the lower storage electrode, and the thickness of the photoresist is different depending on the light passing there through for exposure.

That is, according to the present invention, the portion above the channel region and the lower storage electrode is exposed by the light passing through the mask 612 having the diffraction pattern thereon. Thus, a thin layer of photoresist remains in the portion above the channel region and the lower storage electrode, whereas the portion which is blocked off by a dark portion 614 of the mask is not exposed and remains the initial thickness of the deposited photoresist. As such, the thin photoresist portion is referred to as a half-tone portion 618 (H/T).

In the thin film transistor region, that is, II-II', the photoresist still remains in the region having the source/drain electrode 111, 112 (FIG. 5C) formed thereon because the light does not penetrate therethrough, but light directly penetrates the region above the lower storage electrode 116 so that the all of the photoresist in the region is removed.

FIG. 6B illustrates that the semiconductor layer 113' is exposed above the channel 113*a* and the lower storage electrode 116.

The above exposure is performed by the following processes. First, the photoresist 618 of the H/T region is removed by an ashing process after the H/T region is formed, and a second metal layer 514 (FIG. 6A) in the removed H/T photoresist region is removed by performing a dry etching process for the removed H/T photoresist region. With the second metal layer 514 (FIG. 6A) removed, another dry etching process is performed so as to remove the impure semiconductor layer 512 in the region.

Thus, the remained portion of the second metal layer, which is not removed from the II-II' region, forms the source electrode 111 and the drain electrode 112, and the channel 113*a* is formed between the source electrode 111 and the drain electrode 112.

Further, by the above process, the semiconductor layer 113' formed above the lower storage electrode 116 in the III-III' region is exposed, and by removing the photoresist 616 remaining in the II-II' region, the feature is shown in FIG. 5C.

Figure 5D:
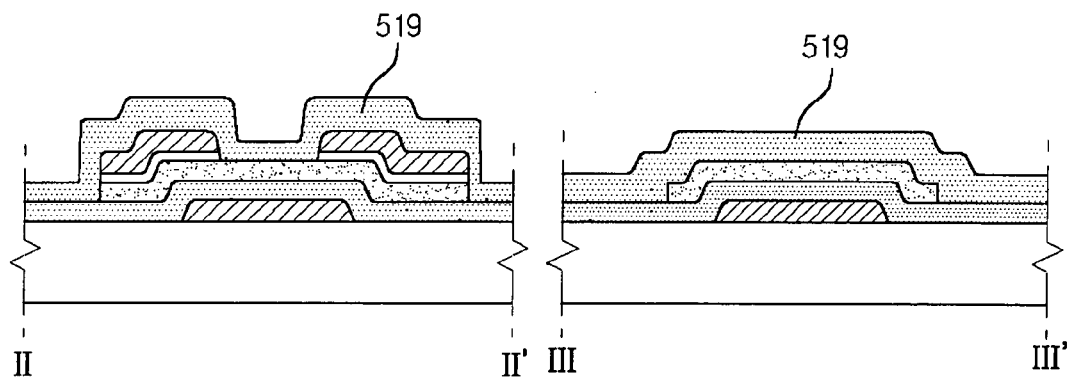
Figure 5E:
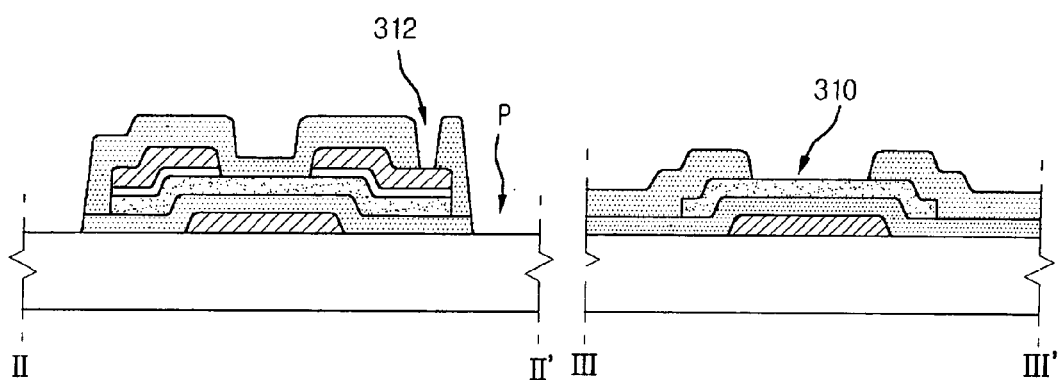

Then, as shown in FIG. 5D, a protection layer 519 is formed above the source/drain electrode 111, 112, the channel layer 113*a* and the exposed semiconductor layer 113'. As shown in FIG. 5E, the protection layer 519 is etched by a third mask so that a contact hole 312 and a through hole 310 are formed above a part of the drain electrode 112 and the exposed semiconductor layer 113', and a transparent electrode is deposited there above.

Figure 5F:
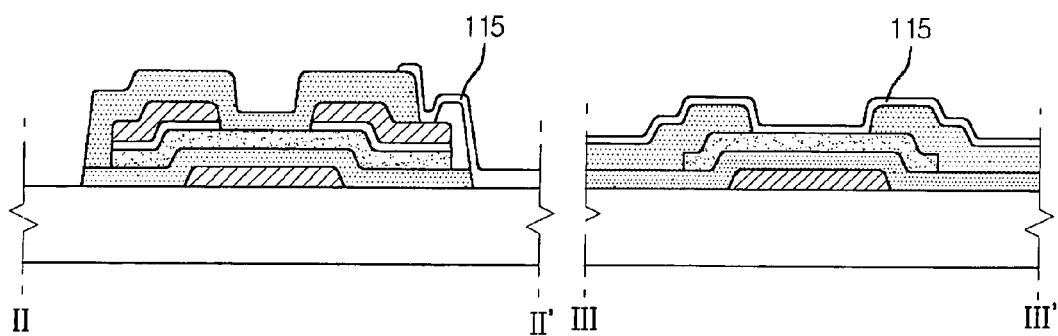

Finally, as shown in FIG. 5F, the transparent electrode is patterned by a fourth mask so as to be electrically connected to the drain electrode 112 through the contact hole 312 and the pixel electrode 115 thereby forming an upper storage electrode corresponding to the lower storage electrode 116.

Thus, there is provided an array substrate of an LCD device having a storage capacitor formed by using the diffraction pattern of a 4-masks process by the above process.

According to the present invention, the array substrate of an LCD device, and the manufacturing method thereof provide advantages such as reducing the rate of process failures in the mask process by reducing the number of masks required to form the storage capacitor, and preventing the decrease of the production yield thereby improving productivity.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An array substrate of an LCD device, comprising:
   a plurality of gate lines aligned on the substrate, a plurality of data lines crossing the gate lines to form a plurality of pixel regions;
   a thin film transistor located at the intersection of a gate line and a data line; and
   a pixel electrode located in each pixel region,
   wherein the array substrate includes a storage capacitor having a lower storage electrode across the data line and in parallel with the gate line on the same layer as the gate line, wherein the lower storage electrode divides the pixel region into two substantially equal sub-regions, and a semiconductor layer interposed between the lower storage electrode and the pixel electrode, wherein the pixel electrode is directly connected to the semiconductor layer by a through hole formed on an upper region of the semiconductor layer.

2. The array substrate of an LCD device of claim 1, wherein the semiconductor layer is inside the pixel region and is at least to be as wide as the lower storage electrode.

3. The array substrate of an LCD device of claim 1, wherein only the semiconductor layer and a gate insulating layer are interposed between the lower storage electrode and the pixel electrode.

4. An array substrate of an LCD device, comprising:
   a gate line, a gate electrode, and a lower storage electrode on the substrate;
   an insulating layer on the substrate having the gate line, gate electrode, and lower storage electrode;
   a semiconductor layer on the lower storage electrode;
   a data line on the substrate having the insulating layer;
   a protection layer on the substrate having the data line, the protection layer having a through hole above a part of the semiconductor layer; and
   a pixel electrode on the protection layer, wherein the pixel electrode contacts the top of the semiconductor layer,
   wherein said gate line and data line cross to form a pixel region, and wherein the lower storage electrode is parallel to the gate line and divides the pixel region into two substantially equal sub-regions, and wherein the pixel electrode is directly connected to the semiconductor layer by the through hole above the semiconductor layer.

5. The array substrate of an LCD device of claim 4, wherein the semiconductor layer is inside the pixel region and is at least as wide as the lower storage electrode.

6. The array substrate of an LCD device of claim 4, wherein only the semiconductor layer and a gate insulating layer are interposed between the lower storage electrode and the pixel electrode.

* * * * *